Sept. 30, 1947.   J. KANUCH   2,428,117

THROTTLING AND UNLOADING VALVE

Filed Dec. 12, 1942

Inventor:
John Kanuch
By: Edward C. Fitzbaugh
Atty

UNITED STATES PATENT OFFICE 2,428,117

THROTTLING AND UNLOADING VALVE

John Kanuch, Cleveland, Ohio, assignor, by mesne assignments, to Borg-Warner Corporation, Chicago, Ill., a corporation of Illinois Application December 12, 1942, Serial No. 468,858

1 Claim. (Cl. 137—153)

This invention relates to an improved valve for use in vacuum systems and the like.

The invention is directed primarily to an improved form of valve arrangement in a system between an evacuating means such as a vacuum pump, and a device or instrument operated on the vacuum created thereby, said valve means being such that the vacuum pump is relieved of the vacuum load when the difference in pressure between two independent points in the system, such as between a cabin or an airplane and atmospheric pressure reaches a certain predetermined amount.

In the operation of airplane instruments, for example, the instruments are normally operated on a vacuum equal to the vacuum pulling about five inches of mercury at sea level on one "side" of the instruments and cabin pressure on the other side. Ordinarily this vacuum should be maintained fairly constant.

It is an object of the present invention to disclose a valve arrangement which will unload the pump automatically when the difference between atmospheric pressure and the pressure in the instrument room or cabin is greater than the vacuum needed to operate such an instrument. In this connection, at altitudes where the cabin supercharger of an airplane, for example, is operated and thereby raises the pressure in the cabin, while the pressure of the outside atmosphere is dropping, the device herein disclosed will respond to the difference between cabin pressure and atmospheric pressure, and will unload the pump more and more after a certain altitude is reached until the atmosphere draws the entire vacuum and the pump has no load.

This unloading action conserves fuel and transfers the additional power from the pump back to the motor.

It is a further object of this invention to provide an improved construction in which the device acts as a "throttling valve" when the pressure in the cabin and the outside pressure do not differ enough to open the valve and unload the pump, but when the pump is pulling a greater vacuum than is needed.

It is another object of this invention to provide a device in which the construction is relatively simple and inexpensive, and has few working parts to get out of order.

Figure 1:
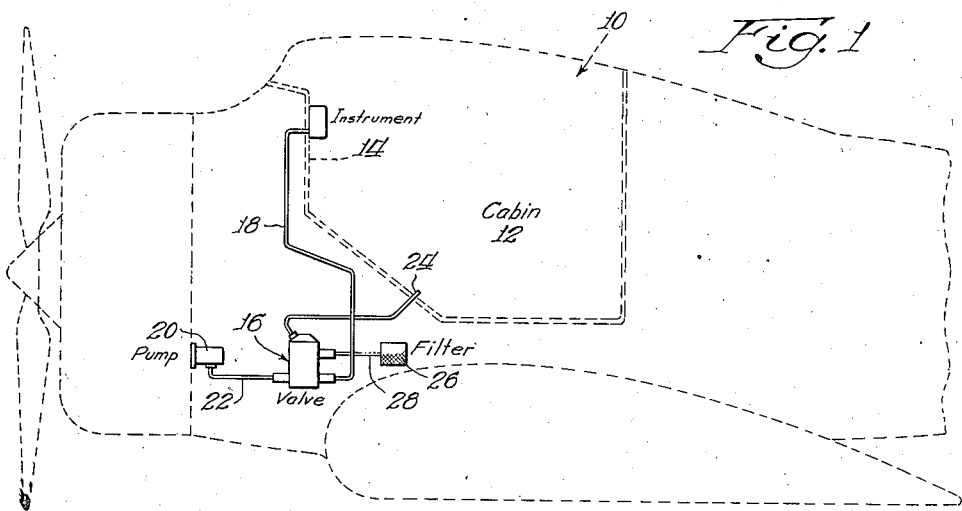
Figure 2:
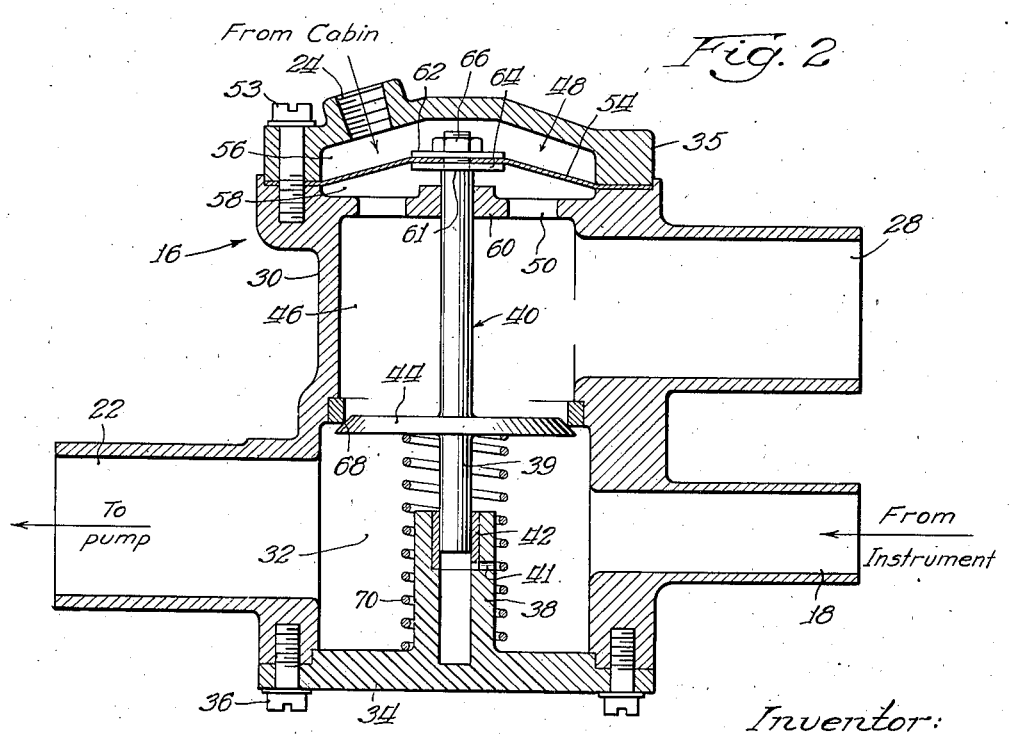

Other objects and uses of this invention will become more apparent from the following description when taken with the accompanying drawing, in which:

Fig. 1 is a schematic view illustrating the present invention as applied to the vacuum system of an instrument for an airplane and the like; and Fig. 2 is a vertical cross-sectional view of the assembly disclosed herein.

Referring more in detail to the construction shown in the figures, and referring first to Fig. 1, there is illustrated an airplane 10, shown in outline form by means of dotted lines, having a cabin 12 of a type which may be supercharged.

There is also provided the instrument panel 14 within the cabin, the assembly 16 forming the subject of the present invention, the vacuum line 18 from the instrument panel to the valve, the vacuum pump 20, a pump line 22 from the valve assembly 16 to the pump, what may be termed a cabin line 24 leading from the cabin and carrying cabin pressure to the valve assembly 16, and a filter 26, having what may be termed a filter line 28, leading from the filter to the valve assembly.

This illustrates schematically the invention herein as it might normally be arranged in such a vacuum system.

Referring to the construction shown in Fig. 2, there is illustrated a valve assembly such as disclosed herein. This comprises a housing 30, which is shown as generally cylindrical in shape, provided with a base 34 and cover 35.

The housing 30 has the vacuum chamber 32, with a connection to the instrument line 18 and another connection, the connecting line 22, leading to the inlet side of the pump 20. The housing 30 is provided, as above mentioned, with the base 34 which comprises the end closure of the cylinder. It has, ordinarily, an airtight fit with the bottom of the housing 30, and may be attached thereto by machine bolts, or the like, 36.

The base 34 has an upstanding valve stem receiving member 38 receiving and retaining the stem 39 of the valve 40 in vertical alignment while allowing the valve 40 to move longitudinally as is clearly apparent from the drawing.

This valve stem receiving and retaining member 38 is provided with a bushing 42 forming a bearing surface for the valve stem 39. The valve stem receiving member 38 is preferably provided with a small hole or opening 41 below the normal position of the bottom of the valve stem for the purpose of breaking any air pressure beneath the valve stem 39, so that said stem is capable of moving longitudinally within the valve receiving opening of the member 38. The housing 30 is likewise provided with what may be termed a second or atmospheric chamber 46, and with a third or head chamber 48.

The atmospheric chamber 46 has means comprising the filter line 28, communicating with the filter 26 and maintaining atmospheric pressure inside of said chamber 46.

The head chamber 48 preferably has an opening communicating with the atmospheric chamber 46, said opening being numbered 50, and a second opening or port 24 communicating with and forming part of the cabin line 24 leading to the cabin 12.

The housing 30 is normally provided with the cover 35, which seats on a pressure responsive means comprising a diaphragm 54, and the cover 35 and diaphragm 54 are attached to the housing 30 so as to form an airtight closure for the upper portion of the housing 30.

The diaphragm 54 is of flexible material, such, for example, as rubberized fabric or neoprene, and it effectively divides the head chamber 48 into subchambers 56 and 58.

The valve 40 has its stem 39 extending upwardly through an opening in the spider 60, which, in cooperation with the valve stem receiving member 38, keeps the valve stem aligned vertically and allows it to move longitudinally. The valve stem 39 is threaded on its upper end and provided with an annular seating ledge at 61, and said valve stem 39 is attached to the diaphragm 54 by means of washers or the like 62 and 64, the latter of which seats on the annular ledge 61 of the valve stem 39 and is retained tightly in place by the nut 66.

As above mentioned, there is provided the valve disc 44. This valve disc 44 is preferably integral with the valve stem 39. The disc 44 seats on the valve seat 68 with which it forms a substantially air-tight seal preventing gas under pressure from passing between the vacuum chamber 32 and the atmospheric chamber 46 when the valve is seated.

The valve disc 44 is urged against the valve seat 68 at all times by a tension means such as by the spring 70. Preferably this coil spring 70 is of a size and type to exert a pressure against the disc sustaining the disc in normal operation against a predetermined vacuum of the amount desired.

The valve assembly disclosed herein may be put together in any convenient manner. One way is to insert the stem 39 of the valve 40 in the center opening on the spider 16 while the base plate 34 and the cover 35 are removed. The washer 64 is then seated on the ledge 61 and the diaphragm 54 is placed on the valve stem 39 over the washer 64. The second washer 62 seats on the valve stem 39 over the diaphragm and the washers are tightly clamped against the diaphragm and on the valve stem 39 by threading on the nut 66. The valve 40 is then moved to a position where the diaphragm 54 may be clamped in place by placing the cover 35 thereon and tightening the machine bolts 53 to clamp the cover against the diaphragm. The position of the valve when the cover is clamped on the diaphragm should be such that after the cover is in place the valve may be moved to the position shown in Fig. 2 and the diaphragm 54 will then be taut. The base 34, with the spring 70 in place around the valve stem receiving member 38, may be moved into position so that the valve stem 39 will enter the opening provided therefor in the valve stem receiving member 38, and the spring 70 will press against the bottom of the valve disc 44, moving it to the seating position against the valve seat 68. The base 34 is then clamped against the housing 30 by means of the machine bolts 36. The assembly is then ready for attaching to the filter line, the instrument line, the pump line, and the cabin line, above described.

It is understood that the assembly may be put together in any order desired, but the above is one way in which it can be done and serves to illustrate such assembly.

In operation, for example when the airplane is on the ground, and the cabin is not supercharged, the pump 22 will create a vacuum of the desired amount in the chamber 32 and the pump line and instrument line.

When the vacuum in the chamber 32 is greater than the desired vacuum, it will exert a pull on the disc 44 sufficient to overcome at least some of the tension of the spring 70 and will move the disc out of the seating position on the valve seat 68. This condition may occur when the motor is raced and the pump is running at higher than normal operating speed. The valve disc 44 under such circumstances will unseat only enough to admit into vacuum chamber 32 a quantity of air just sufficient to balance the excess vacuum over that desired, and it will seat again when the vacuum is balanced.

As the plane rises, the atmospheric pressure in the chamber 46 decreases. This exerts no particular effect on the valve 40, since it is balanced by the decreasing force on the opposite surfaces— on the one side the diaphragm 54 and on the other side the valve disc 44. Likewise, the subchamber 56 will have atmospheric pressure until the supercharger is started. Therefore, under such circumstances the only forces acting on the valve disc 44 are the vacuum in the chamber 32, and the counterbalancing action of the spring 70.

As the supercharger in the cabin is started the force opposing the spring 70 comprises the difference between cabin pressure in the subchamber 56 and atmospheric pressure in the subchamber 58, plus the vacuum in the chamber 32. This unseats the valve disc 44 more and more within maximum limits as the plane goes up, and allows the atmosphere to enter the chamber 32. As long as the atmospheric pressure is greater than the vacuum required for chamber 32, there will be a restricted amount of unseating of the valve disc 44 so that the pump continues to pull at least some vacuum in the chamber 32. When, however, the atmospheric pressure drops to where it is equal to or less than the vacuum required in chamber 32, the valve disc 44 will be entirely unseated and the vacuum necessary for the instrument is created by the atmosphere. This will unload the pump entirely. It is understood that under these conditions the pressure in the cabin created by the supercharger exceeds atmospheric pressure by an amount equal to the force exerted on disc 44 by spring 70.

The total unseating of disc 44 allows the instrument to operate on the differential between atmospheric pressure and the cabin pressure, and entirely unloads the pump, so that the energy necessary to pull the vacuum and maintain it in the chamber 32 is transferred to the motor with consequent saving in power.

One further condition must ordinarily be met when the device is operated at extreme altitudes such as, for example, 40,000 feet. In such altitudes, the atmospheric pressure is so low that the "vacuum" in the chamber 32 is more than that necessary to operate the instrument, and must be balanced in some way so that the instrument will not be adversely affected. For that purpose, it is desirable to insert a second throttling valve (not shown) connected to cabin pressure in the instrument line between the instrument and the chamber 32, and operating so that when the vacuum in the instrument line drops below the necessary amount, the second throttling valve will take some of the pressure in the cabin and introduce it into the instrument line thus balancing the vacuum at the point desired.

It is understood that the foregoing description is merely illustrative of a preferred embodiment of the invention and that the scope of the invention, therefore, is not to be limited thereto but is to be determined by the appended claim.

I claim:

A vacuum control valve unit for maintaining a selected differential pressure for operating flight instruments which are positioned in a region of fluctuating pressure, including means defining a chamber which is in communication with a source of vacuum, means for regulating the communication of the surrounding atmosphere with said chamber effective to maintain said selected differential of pressure, said means including a valve adapted to control communication between said chamber and the surrounding atmosphere, resilient means urging said valve in the direction of closed position, said last mentioned means being operable to allow said valve to open under the influence of the source of vacuum, diaphragm means connected with said valve effective on the valve side of said diaphragm to balance said valve against the influence of atmospheric pressure and adapted on the opposite side of said diaphragm to be placed in communication with a second source of pressure, whereby said valve is caused to maintain said selected differential pressure by opening said valve to admit atmospheric pressure to said chamber whenever the differential between the pressure on the opposite side of the diaphragm and atmospheric pressure exerts a force greater than the force provided by said resilient means for urging the valve closed.

JOHN KANUCH.

REFERENCES CITED

The following references are of record in the file of this patent:

UNITED STATES PATENTS

| Number | Name | Date |
|---|---|---|
| 1,987,666 | Carlson | Jan. 15, 1935 |
| 2,232,267 | Price | Feb. 18, 1941 |
| 2,194,749 | Gregg | Mar. 26, 1940 |
| 2,308,583 | Berges | Jan. 19, 1943 |
| 947,021 | Malivert | Jan. 18, 1910 |
| 767,138 | Comstock | Aug. 9, 1904 |
| 1,224,221 | Schwanebeck | May 1, 1917 |
| 1,539,228 | Wright | May 26, 1925 |
| 1,046,884 | Spencer | Dec. 10, 1912 |
| 2,402,499 | Lawrence | June 18, 1946 |
| 1,142,289 | Wadsworth | June 8, 1915 |